Patented Apr. 3, 1951

2,547,815

UNITED STATES PATENT OFFICE 2,547,815

COPOLYMERIZATION OF VINYLIDENE HALIDES WITH CERTAIN ETHYLENICALLY UNSATURATED COMPOUNDS

Willem Leendert Johannes de Nie, Amsterdam, Netherlands, assignor to Shell Development Company, San Francisco, Calif., a corporation of Delaware No Drawing. Application July 14, 1947, Serial No. 760,929. In the Netherlands December 10, 1942

Section 1, Public Law 690, August 8, 1946
Patent expires December 10, 1962

13 Claims. (Cl. 260—87.7)

1

This invention relates to a process for the manufacture of copolymers of vinyl compounds and vinylidene halides by polymerization in an emulsion.

The expression vinyl compounds as used hereinafter is to be taken in a broad sense thereby including compounds such as the vinyl halides, including vinyl chloride, vinyl bromide, vinyl fluoride and vinyl iodide; vinyl esters such as vinyl acetate; styrene; esters of acrylic and methylacrylic acids, such as ethyl acrylate and methyl methacrylate; butadiene and other compounds which contain the characteristic vinyl linkage. The vinylidene halides which may be used for the purposes of the present invention include vinylidene chloride, vinylidene bromide, vinylidene fluoride and vinylidene iodide.

For the sake of brevity, the process of the present invention is hereinafter described as it is applied to the copolymerization of vinyl chloride with vinylidene chloride, although it must be understood that the invention is not restricted to the copolymerization of these two specific compounds.

It is already well known to polymerize vinyl compounds in the emulsified state in the presence of polymerization catalysts such as hydrogen peroxide and benzoyl peroxide. As is well known, vinyl chloride before it is polymerized must be passed through an induction period which may take as long as several hours. The addition of vinylidene chloride to the emulsion has no noticeable influence on this induction period.

On the other hand, vinylidene chloride has a tendency toward rapid polymerization so that its induction period is very short. As a result of these factors, when one attempts to copolymerize vinyl chloride with vinylidene chloride the vinylidene chloride immediately begins to polymerize so that by the time the vinyl chloride has started polymerization, the polymerization of the vinylidene chloride is well advanced. Thus, the copolymers produce in this way do not contain molecules of uniform constitution, but those molecules which have polymerized during the early stages contain almost no vinylidene chloride polymers. The product so obtained therefore contains polymers with different chlorine contents and divergent molecular weights.

The reaction products obtained by the known process of copolymerizing vinylidene chloride with vinyl chloride and composed of less than about 15% by weight of vinylidene chloride are hard products, and, when mixed with plasticizers, show rubber-like properties and poor solubility

2 in the usual solvents such as acetone. Thus they are very similar to the homopolymers of vinyl chloride. It has now been found that the reason for this similarity must be attributed to the presence of vinyl chloride polymers which contain relatively little vinylidene chloride and which are mixed with polymers which contain a large proportion of vinylidene chloride.

The copolymers containing more than about 15% by weight of vinylidene chloride are resinous substances which may be dissolved in the usual solvents and used in the manufacture of lacquer and varnish. When made in the usual way, such copolymers frequently are unsatisfactory because of their low mechanical strength and chemical stability.

The object of the present invention is to provide a process for copolymerizing vinyl chloride with vinylidene chloride to produce copolymers which are not composed of molecules which are widely divergent in halogen content and molecular weight. In other words, the invention provides a process for producing copolymers having a substantial homogenous composition.

In general, the objects of the present invention are accomplished by first subjecting vinyl chloride to polymerizing conditions and, after at least part of the induction period has passed, adding thereto vinylidene chloride and completing the polymerization. In this manner the too rapid polymerization of the vinylidene chloride at the start of the reaction is avoided as well as the production of copolymers which are deficient in vinylidene chloride when the reaction is substantially complete.

The copolymers composed of approximately 5 to approximately 15 per cent by weight of vinylidene chloride which are prepared according to the process of this invention have great tensile strength and chemical stability and thus form better raw materials for the lacquer and varnish industry than the copolymers heretofore known.

The duration of the induction period for the vinyl chloride depends greatly on the reaction temperature, the catalyst concentration, the emulsion concentration, and the emulsifier used in the emulsification. It is therefore impossible to set a definite time for the addition of the vinylidene chloride to the reaction mixture. However, it is relatively simple to test a small batch of vinylchloride, emulsified in accordance with conditions to be used, and to determine the induction period for the emulsion. The vinylidene chloride should be added to the emulsion shortly before the induction period is over and before the "growing" reaction commences.

It has been found that when copolymerizing vinylidene chloride with vinyl chloride not all of the vinylidene chloride is polymerized. Therefore one should ordinarily use more vinylidene chloride than is described in the final copolymer.

The temperature at which the polymerization is carried out generally ranges from about 20° C. to about 80° C. and it is preferred to operate at temperatures between about 30° C. and about 50° C. Temperatures above about 60° C. yield products with little elasticity and low tensile strength at rupture. Although the reaction goes faster at higher temperatures it is preferred to operate at lower temperatures within the range given above to secure products having the highest possible elasticity and tensile strength. It is possible to speed up the reaction by using a high temperature during the induction period for vinyl chloride and by reducing the temperature at the time the vinylidene chloride is added.

Instead of a mixture of vinyl chloride and vinylidene chloride it will be apparent that the invention may also be practised by using mixtures of two or more vinyl compounds which are first subjected to polymerizing conditions and that mixtures of two or more vinylidene compounds may be added after the induction period is substantially complete.

Before, during or after the copolymerization as described above various modifiers may be added such as plasticizers, fillers and coloring matter.

The following examples illustrate preferred methods of practicing the present invention.

Example I

A mixture containing 930 ml. of 24.2% sodium cetyl sulfate, 30 ml. of 30% hydrogen peroxide and 2,460 ml. of distilled water was placed in an autoclave. The pH of the solution was reduced to 6 by the addition of sulfuric acid. Subsequently 820 grams of vinyl chloride was pumped into the autoclave under pressure. After about one hour the temperature was increased from room temperature to 61° C. After the reaction mixture has been kept at 61° C. for three hours, 220 grams of vinylidene chloride was rapidly added under pressure. Within two hours after the vinylidene chloride was added rapid polymerization set in. The polymer suspension was then coagulated by the addition of an aluminum sulfate solution and the polymer was purified by washing. The chlorine content of the dried polymer was determined and found to be 55.9% by weight which corresponds to approximately 10% of the vinylidene chloride consumed in the total polymer formation. During the reaction the entire amount of the vinylidene chloride was not consumed.

The polymer which was produced was tested and found to have the following properties: At room temperature it was perfectly soluble in a mixture of butyl acetate and xylene (1:1) and also in ethyl acetate and in acetone. Well cohering films could be obtained by spread out these solutions and allowing the solvent to evaporate. When mixed with 20% of a plasticizer (one part of dibutyl phthalate plus one part of butyl phthalate) a supple sheet was obtained which had no rubber-like properties.

Example II

In order to compare copolymerization by the conventional process to that of the present invention, the experiment of Example I was repeated with the exception that the vinylidene chloride and vinyl chloride were added to the aqueous solution at the same time. The reaction products which resulted had a chlorine content of 58.2%, corresponding to 22% of vinylidene chloride. This product was only partially soluble in butyl acetate-xylene (1:1) and was very difficult to dissolve in ethyl acetate plus acetone (1:1) or in ethylene dichloride. Films were prepared as above, but they were not strong and showed little adhesion to the base.

Example III

The same procedure was followed as in Example I with the exception that immediately after the addition of the vinylidene chloride, the polymerization temperature was decreased to 50° C. The polymer which was recovered was difficult to dissolve in ethyl acetate and acetone but was completely soluble in ethylene dichloride. Solvent films were prepared from these solutions and the film was superior from a mechanical point of view to that obtained according to Example I. The chlorine content of the reaction product amounted to 54.9 by weight, corresponding to about 5% of vinylidene chloride.

I claim as my invention:

1. A process for copolymerizing vinyl chloride with vinylidene chloride comprising emulsifying 82 parts by weight of vinyl chloride with a mixture containing water, an emulsifying agent and a peroxide polymerization catalyst, maintaining the resulting mixture at room temperature for 1 hour and then maintaining the mixture at 61° C. for 3 hours, rapidly adding to the mixture 22 parts of vinylidene chloride and lowering the temperature of the mixture to 50° C. to complete the polymerization.

2. A process for copolymerizing vinyl chloride with vinylidene chloride comprising emulsifying 82 parts by weight of vinyl chloride with a mixture containing water, an emulsifying agent and a peroxide polymerization catalyst, heating the resulting mixture for 3 hours at a temperature at 61° C., rapidly adding to the reaction mixture 22 parts of vinylidene chloride and maintaining the mixture at 61° C. until the polymerization is substantially complete.

3. A process for producing copolymers of vinyl chloride and vinylidene chloride containing from 5% to 15% by weight of vinylidene chloride comprising emulsifying monomeric vinyl chloride with a mixture containing water, an emulsifying agent and a peroxide polymerization catalyst, heating the resulting mixture at a temperature between 20° C. and 80° C. until the induction period of the vinyl chloride is substantially complete, then rapidly adding to the resulting mixture vinylidene chloride in slight excess of the amount to be present in the final copolymer, and maintaining the resulting mixture at a lower temperature within the range of 20° C. to 80° C. than was employed before the addition, to complete the polymerization.

4. A process for producing copolymers of vinyl chloride and vinylidene chloride containing from 5% to 15% by weight of vinylidene chloride comprising emulsifying monomeric vinyl chloride with a mixture containing water, an emulsifying agent and a peroxide polymerization catalyst heating the resulting mixture at a temperature between 20° C. and 80° C. until part of the induction period required for the polymerization of the vinyl chloride has passed, then rapidly adding at one time to the reaction mixture monomeric vinylidene chloride in excess of the amount to be present in the final copolymer, and maintaining the resulting mixture at the same temperature employed before the addition until the polymerization is substantially complete.

5. A process for producing copolymers of vinyl chloride and vinylidene chloride containing from 5% to 15% by weight of vinylidene chloride comprising emulsifying monomeric vinyl chloride with a mixture containing water, an emulsifying agent and a polymerization catalyst, heating the resulting mixture at a temperature between 20° C. and 80° C. until part of the induction period required for the polymerization of the vinyl chloride has passed then rapidly adding at one time to the reaction mixture monomeric vinylidene chloride in slight excess of that required in the final copolymer, and maintaining the mixture at a lower temperature within the range 20° C. and 80° C. than was employed before the said addition, to complete the polymerization.

6. A process for producing a copolymer of a vinylidene halide and an ethylenically unsaturated compound selected from the group consisting of vinyl halides, vinyl esters of saturated monocarboxylic acids, styrene, acrylic acid esters of saturated monohydric alcohols, methacrylic acid esters of saturated monohydric alcohols, and butadiene, containing from 5% to 15% by weight of the vinylidene halide comprising emulsifying the said ethylenically unsaturated compound with a mixture containing water, an emulsifying agent and a peroxide polymerization catalyst, heating the resulting mixture at a temperature of 61° C. until part of the induction period required for the polymerization of the ethylenically unsaturated compound has passed, rapidly adding at one time to the reaction mixture the vinylidene halide in excess of the amount to be present in the final copolymer, and reducing the temperature of the mixture to 50° C. to complete the polymerization.

7. A process for producing a copolymer of a vinylidene halide and an ethylenically unsaturated compound selected from the group consisting of vinyl halides, vinyl esters of saturated monocarboxylic acids, styrene, acrylic acid esters of saturated monohydric alcohols, methacrylic acid esters of saturated monohydric alcohols and butadiene, containing from 5% to 15% by weight of the vinylidene halide comprising emulsifying the said ethylenically unsaturated compound with a mixture containing water, an emulsifying agent and a polymerization catalyst, heating the resulting mixture at a temperature between 20° C. to 80° C. until the induction period of the ethylenically unsaturated compound is substantially complete, then rapidly adding to the resulting mixture the vinylidene halide in amount slightly in excess of the amount to be present in the final copolymer, and maintaining the resulting mixture at the same temperature employed prior to the addition to complete the polymerization.

8. A process for producing a copolymer of vinylidene halide and an ethylenically unsaturated compounds selected from the group consisting of vinyl halides, vinyl esters of saturated monocarboxylic acids, styrene, acrylic acid esters of saturated monohydric alcohols, methacrylic acid esters of saturated monohydric alcohols and butadiene, containing from 5% to 15% by weight of the vinylidene halide comprising emulsifying the said ethylenically unsaturated compounds with a mixture containing water and a polymerization catalyst, heating the resulting mixture at a temperature between 20° C. to 80° C. until part of the induction period required for the polymerization of the ethylenically unsaturated compound has passed, adding to the reaction mixture monomeric the vinylidene halide in excess of the amount to be present in the final copolymer, and maintaining the resulting mixture at a temperature between 20° C. to 80° C. to complete the polymerization.

9. A process for producing a copolymer of a vinyl halide and a vinylidene halide containing from 5% to 15% by weight of the vinylidene halide comprising emulsifying the vinyl halide with a mixture containing water, an emulsifying agent and a peroxide polymerization catalyst, heating the resulting mixture at a temperature between 30° C. and 50° C. until part of the induction period of the vinyl halide has passed, then rapidly adding at one time to the reaction mixture the monomeric vinylidene halide in slight excess of the amount to be present in the final copolymer, and maintaining the resulting mixture at a temperature between 30° C. and 50° C. until the polymerization is substantially complete.

10. In a process for producing a copolymer of a vinylidene halide and an ethylenically unsaturated compound of the group consisting of vinyl halides, vinyl esters of saturated monocarboxylic acids, styrene, acrylic acid esters of saturated monohydric alcohols, methacrylic acid esters of saturated monohydric alcohols, and butadiene, the steps which comprise heating a mixture containing the ethylenically unsaturated compound, water, an emulsifying agent and a polymerization catalyst at a temperature between 20° C. and 80° C. until part of the induction period of the said ethylenically unsaturated compound has passed and then adding at one time the vinylidene halide and continuing the polymerization at a temperature between 20° C. and 80° C.

11. A process for producing a copolymer of a vinylidene halide and styrene which comprises heating a mixture containing styrene, water and an emulsifying agent and a polymerization catalyst at a temperature between 20° C. and 80° C. until part of the induction period of styrene has passed and then adding the total quantity of vinylidene halide and continuing the polymerization at a temperature between 20° C. and 80° C.

12. A process for producing a copolymer of a vinylidene halide and butadiene which comprises heating a mixture containing butadiene, water and an emulsifying agent and a polymerization catalyst at a temperature between 20° C. and 80° C. until part of the induction period of butadiene has passed and then adding the total quantity of the vinylidene halide and continuing the polymerization at a temperature between 20° C. and 80° C.

13. A process for producing a copolymer of vinylidene chloride and vinyl chloride which comprises heating a mixture containing vinyl chloride, water and an emulsifying agent and a polymerization catalyst at a temperature between 20° C. and 80° C. until part of the induction period of the vinyl chloride has passed and then adding the total quantity of the vinylidene chloride and continuing the polymerization at a temperature between 20° C. and 80° C.

WILLEM LEENDERT JOHANNES DE NIE.

(References on following page)

REFERENCES CITED

The following references are of record in the file of this patent:

UNITED STATES PATENTS

| Number | Name | Date |
|---|---|---|
| 2,100,900 | Fikentscher | Nov. 30, 1937 |
| 2,348,154 | Scott et al. | May 2, 1944 |
| 2,371,618 | Hanson et al. | Mar. 20, 1945 |

OTHER REFERENCES

Bennett's Concise Chemical and Technical Dictionary, Chemical Publishing Company, 1947, pp. xxiii.